US011869336B2

(12) United States Patent
Ökvist et al.

(10) Patent No.: US 11,869,336 B2
(45) Date of Patent: Jan. 9, 2024

(54) METHOD AND A COMMUNICATION DEVICE FOR COORDINATED SIGNALLING

(71) Applicant: Telefonaktiebolaget LM Ericsson (publ), Stockholm (SE)

(72) Inventors: Peter Ökvist, Luleå (SE); Tommy Arngren, Södra Sunderbyn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/760,525

(22) PCT Filed: Sep. 19, 2019

(86) PCT No.: PCT/EP2019/075115
§ 371 (c)(1),
(2) Date: Mar. 15, 2022

(87) PCT Pub. No.: WO2021/052583
PCT Pub. Date: Mar. 25, 2021

(65) Prior Publication Data
US 2022/0351604 A1 Nov. 3, 2022

(51) Int. Cl.
*G08B 25/00* (2006.01)
*G08B 25/10* (2006.01)

(52) U.S. Cl.
CPC .......... *G08B 25/001* (2013.01); *G08B 25/10* (2013.01)

(58) Field of Classification Search
CPC . G08B 25/001; G08B 25/10; H04M 1/72418; H04W 4/08; H04W 4/18; H04W 4/90
See application file for complete search history.

(56) References Cited

U.S. PATENT DOCUMENTS

2014/0233458 A1* 8/2014 Georgescu .............. H04W 4/22
370/328

FOREIGN PATENT DOCUMENTS

WO 2016133249 A1 8/2016

OTHER PUBLICATIONS

Doria, Avri, et al., "Providing connectivity to the Saami nomadic community," Generations, 2009, ThinkCycle, 8 pages.
Sjodin, Samuel, "WiFi Hotspots for Reindeer Herding and other Delay-Tolerant Applications," Degree Project, Lulea University of Technology, 2017, 62 pages.
International Search Report and Written Opinion for International Patent Application No. PCT/EP2019/075115, dated Jan. 31, 2020, 11 pages.

* cited by examiner

*Primary Examiner* — Ojiako K Nwugo
(74) *Attorney, Agent, or Firm* — Sage Patent Group

(57) ABSTRACT

A method, executable at a first communication device, for enabling communication between a group of communication devices, including the first communication device is suggested. The suggested method comprise activating the first communication device in response to recognizing a cause for triggering such activation, recognizing at least one second communication device, exchanging data between the first and the at least one second communication device, in response to recognizing the at least one second communication device, determining, based on the exchanged data, rules to be applied for a coordinated signaling, from the first communication device and at least one of the at least one second communication device, and initiating the coordinated signaling, based on the determined rules.

22 Claims, 9 Drawing Sheets

METHOD AND A COMMUNICATION DEVICE FOR COORDINATED SIGNALLING

This application is a 35 U.S.C. § 371 national phase filing of International Application No. PCT/EP2019/075115, filed Sep. 19, 2019, the disclosure of which is incorporated herein by reference in its entirety.

TECHNICAL FIELD

The present disclosure relates to a method for enabling coordinated signaling and a communication device, capable of executing such a method.

BACKGROUND

In distressed situations, where a plurality of individuals are involved, such as e.g. in a maritime distress situation, when a plurality of individuals have fallen overboard or have been forced to leave a boat or ship, by going into the water, it is crucial for an upcoming rescue mission to get as comprehensive information about the situation as possible, and, preferably, having a good overview of the situation as early as possible, when approaching the relevant area.

Apart from maritime situations, similar challenges are likely to occur also in various other types of rescue scenarios, such as e.g. after earth quakes, avalanches, flooding, alpine or mountaineering incidents or scuba diving incidents, or any other incident, which involve significant challenges for rescue personal when it comes to prioritizing and getting a relevant and accurate picture of an emergency scene.

In practice, more or less hash circumstances, such as e.g. rough weather, darkness, no or limited network access, may make an already difficult and stressful situation even more complex to handle for rescue personal, due to e.g. difficulty in getting relevant and accurate information in a timely manner, and finally to manage the rescue mission situation with a satisfactory outcome.

Even if rescue personal is provided with data about an emergency situation, a multitude of information, arriving from a plethora of distressed individuals, being in a more or less chaotic situation, could very well result in an overflow if input for the rescue team.

A delay tolerant networks (DTN), typically advances wireless traffic, despite any possible hostile conditions, caused by e.g. jamming activity or damaged or malfunctioning network nodes. While traditional IP networks relay on end-to-end connectivity, which means that data can be sent only when there is an identifiable path all the way from the source to the destination, DTN continues to advance data even when there is no complete, identifiable path available. DTN uses intermittently available links to communicate opportunistically, where information is organized into bundles, rather than packets and routed through, what can be referred to as, intelligent "custodians", that are capable of augmenting traditional routers whenever that is considered needed. Such custodians may advance the bundles from one network node to another, until the destination has been reached. A network which such facilities may make use of various types of communication nodes, such as e.g., wireless, fixed, satellite based or vehicle mounted, such as e.g. unmanned aerial vehicle (UAV) mounted communication nodes, to continuously advance message traffic even when there is an obstacle in the original path that would typically have stopped the traffic in a traditional network.

Moreover, a DTN can overcome problems characterized by e.g. long delay, asymmetric data rates, intermittent connectivity, high error rates caused by extreme environments, distances encountered in space communication at interplanetary scales, sufficiently when compared with the corresponding situation for a traditional Internet suite.

A DTN network architecture is composed of computing systems, participating in the network, comprising so called host nodes, having a stack as illustrated in FIG. 1, where these host nodes are configured to route data through Custody Transfer (CT), which are adapted to keep the data bundles until necessary resources are available, before further transmission is executed.

One example of a DTN implementation is the Saami Network Connectivity project, as disclosed in: https://www.researchgate.net/publication/242409187_Providing_connectivity_to_the_Saami_nomadic_community The mentioned project seeks to establish Internet communication for the Saami population of reindeer herders who live in remote areas of Swedish Lapland by providing what is referred to as a Saami Network Connectivity (SNC) network. This population currently does not have reliable wired, wireless or satellite communication capabilities in major areas within which that work and occupy.

The basic design of a network, addressing the posed problem involves setting each remote area as its own network region. At the edge of a Network Access Translation (NAT), a Gateway is adapted to provide an Application Layer Gateway, which is capable of terminating applications and of producing data bundles. The data bundles are then relayed between Gateways, using DTN routing, through a series of fixed and mobile relay caches. The mobile relay caches travel periodically between residential communities and meeting points, where the data bundles can be exchanged, and between locations where Gateways, connecting to the Internet and/or other community nets, are available. More information on the mentioned solution can be retrieved in: https://ltu.diva-portal.org/smash/get/diva2:1165608/FULLTEXT01.pdf Data bundles are essentially handled by a store and forward mechanism that allows for all the information required for completing an action to be combined into a single datagram. The nature of the mentioned SNC network will require that the applied data bundles are stored for a significant period of time before they are forwarded, whenever connectivity is available again. Thus, the SNC network will, at its core, be a store and forward network where a datagram is stored until resources, necessary for data forwarding is again available, where the forwarding latency may be as short as seconds, or as long as hours, or even longer. The latter scenario may be acceptable in situations where it is more important that data is received within a reasonable time, than that data is delivered more or less instantly.

SUMMARY

It is an object of the present document to address, or at least alleviate, at least some of the problems described above. More specifically, a method for executing coordinated signaling and a communication device, capable of executing the suggested method is disclosed.

By applying the suggested method at a communication device adapted therefore, a plurality of communication devices executing signaling for the purpose of being detected will be able to execute such signaling in a more efficient way, both with respect to increasing the chance of detection from a long distance, as well as to use the resources of each communication device more efficiently, thereby allowing the mentioned coordinated signaling to proceed for a longer duration of time.

According to one aspect a method, executable at a first communication device, for enabling communication between a group of communication devices, including the first communication device, is suggested. The method comprise activating the first communication device in response to recognizing a cause for triggering such activation, recognizing at least one second communication device, exchanging data between the first and the at least one second communication device, in response to recognizing the at least one second communication device, determining, based on the exchanged data, rules to be applied for a coordinated signaling, from the first communication device and at least one of the at least one second communication device, and initiating the coordinated signaling, based on the determined rules.

According to another aspect a first communication device, for enabling communication between a group of communication devices, including the first communication device, is suggested. The first communication device is adapted to activate the first communication device in response to recognizing a cause for triggering such activation, recognize at least one second communication device, exchange data between the first and the at least one second communication device, in response to recognizing the at least one second communication device, determine, based on the exchanged data, rules to be applied for a coordinated signaling, from the first communication device and at least one of the at least one second communication device, and initiate the coordinated signaling, based on the determined rules.

According to yet another aspect a first communication device, for enabling communication between a group of communication devices, including the first communication device, is suggested, where the first communication device comprise processing circuitry and computer readable instructions which when executed by the processing circuitry causes the first communication device to: activate the first communication device in response to recognizing a cause for triggering such activation, recognize at least one second communication device, exchange data between the first and the at least one second communication device, in response to recognizing the at least one second communication device, determine, based on the exchanged data, rules to be applied for a coordinated signaling, from the first communication device and at least one of the at least one second communication device, and initiate the coordinated signaling, based on the determined rules.

BRIEF DESCRIPTION OF DRAWINGS

Embodiments will now be described in more detail in relation to the accompanying drawings, in which.

DETAILED DESCRIPTION

Figure 1A:
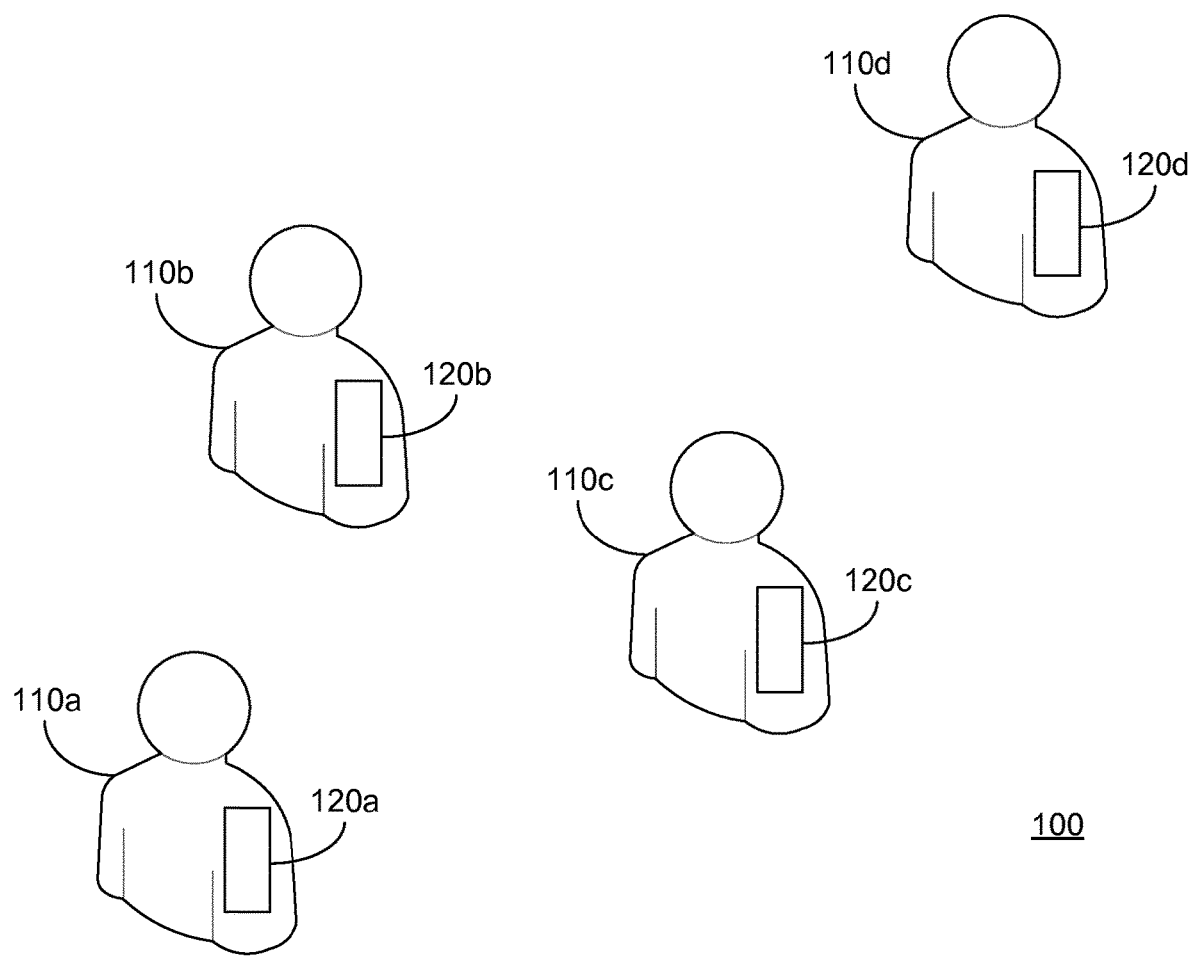
FIG. 1a is illustrating a scenario, according to a first embodiment, with a plurality of individuals, each provided with a communication device, capable of executing coordinated signaling.

In emergency situations, involving a plurality of individuals, which sometimes can amount to a significant number, such as in a maritime accident situation, where a number of individuals have been forced to abandon a ship, it may be difficult to emergency personal or other rescuers to access appropriate information about the present situation, including localization of the people in distress, the number of people in distress and their personal condition. Especially in situations where a large number of persons are in distress, it may be crucial for the rescue staff arriving to an emergency scene to get timely and accurate information of the present situation, that will enable the rescue staff to prioritize the rescue efforts as efficiently as possible, when time often has become a crucial factor. At a larger maritime distress situation, with plethora of life vest light being in the sea and a plethora of Search And Rescue (SAR) lights, the challenge of whom to prioritize for a first action can make such a task very complex.

Existing technologies, such as e.g. ordinary floating devices, including e.g. life jackets or suits or care vests, equipped with a whistle and, possibly also a signal lamp will, although important, in many situations not provide sufficient critical overall information to an approaching rescue team. A whistle sound may not overcome the physical distance to approaching rescuing personal, since e.g. a helicopter based rescue personal may not be able to hear any whistle sound due to the helicopter noise. Traditional SAR lights or avalanche transceivers are suitable for locating people in distress when in the water or when caught in the snow. However, such lights operate individual from each other and does not provide any effect further than making one individual more visible. Also more advanced equipment, provided with locating devices, such as e.g. the SAR equipment, referred to in https://www.safeatsea.se/sar-equipment/, or bio-sensor inclusions, does not include any ad-hoc network aspects, but all work on an individual basis.

It would be advantageous if equipment worn by different individuals located relatively close to each other could coordinate data collection as well as transmission, e.g. when emitting light for the purpose of simplifying detection. It would also be an advantage if the transmission could be provided with additional information on a group of individuals in distress, in order to give an overview of an emergency situation to approaching rescue personal.

Known DTNs advance data even when there is no complete identifiable path to a destination, and lack group handling and coordinated, or synchronized signaling capabilities. No known solutions, suitable to be applied in scenarios, such as any of the ones mentioned above, provide means of coordinating transmission, such as e.g. coordinating light emission. Nor are there any solutions for exchanging data, collected by coordinated devices, for obtaining data for planning and scheduling more enhanced and efficient emission of light from the group of coordinated devices.

A method is therefore suggested for identifying communication devices, which are capable of providing coordinated signaling; for executing data exchange between the identified communication devices; for determining rules for how to coordinate transmission from the identified communication devices, and for initiating coordinated signaling from the identified communication devices. A communication device, capable of executing the method mentioned above is also suggested.

The suggested method will enable communication devices to exchange data collected from various types of sensors, to evaluate collected data, and determine rules, applicable for the communication devices, so that transmission from each of the mentioned communication devices can be done in a coordinated manner, instead of executed individually. Thereby, the time until the communication devices run out of battery can be prolonged, since transmission can be executed in a more efficient manner. In addition, coordinated signaling, such as e.g. emission of light, may greatly enhance the probability of detection, compared to if each communication device is transmitting individually, since the effect of the emission can be improved considerably if coordinated.

In addition, the information conveyed to a rescue team, e.g. by emitting light, may be coded so that emitted light provides also information on the present situation of the group of individuals.

A typical scenario, in which the suggested method can be applied is illustrated with the system 100 of FIG. 1*a*, where four individuals, 110*a*,110*b*,110*c*, 110*d*, each wearing a communication device 120*a*,120*b*,120*c*,120*d*, are caught is a critical situation. Upon triggering initiation of communication devices 120*a*,120*b*, these two communication devices have discovered each other and set up a communication, after which communication has also been set up with communication devices 120*c*,120*b*, so that, eventually all four communication devices 120*a*,120*b*,120*c*,120*d* are communicating with each other, where it is determined that the four communication devices 120*a*,120*b*,120*c*,120*d* are to form a group for mutual data exchange and coordinated signaling.

Figure 1B:
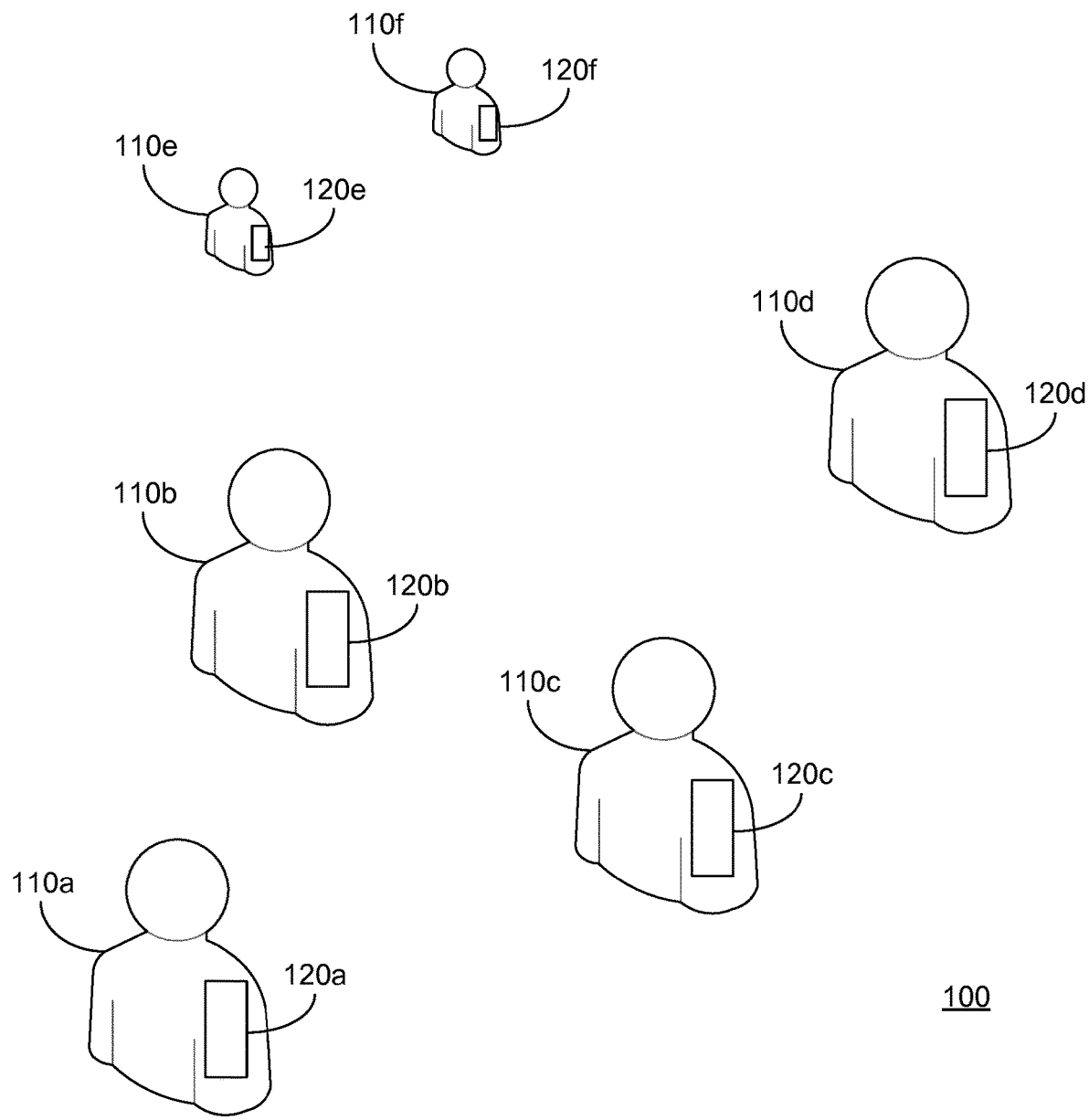
FIG. 1b is illustrating a scenario, according to a second embodiment, with a plurality of individuals, each provided with a communication device, capable of executing coordinated signaling.

Once such a process has been established, a group formation can be continuously challenged and updated, such that, in a scenario, as illustrated in FIG. 1*b*, when two more individuals 110*e*,110*f*, each wearing a respective communication device 120*e*, 120*f*, being within reach of the other communication devices 120*a*,120*b*,120*c*,120*d* can be instructed to join a group of communication devices, such as e.g. the group 120*a*,120*b*,120*c*, 120*d*.

In order to be able to consider various update options, communication of data between communication devices can be repeated, e.g. at certain static or dynamic time intervals. An updated decision may be based on changed distances between the respective communication devices 120*a*,120*b*, 120*c*,210*d*,120*e*,120*f*.

If however it is determined that the two groups of communication devices are located more distant from each other, it may instead be decided that the communication devices are to be divided into the two separate groups 120*a*,120*b*, 120*c*,120*d*,120*e*,120*f*, where coordination is considered to be executed more efficiently within each group.

Figure 1C:
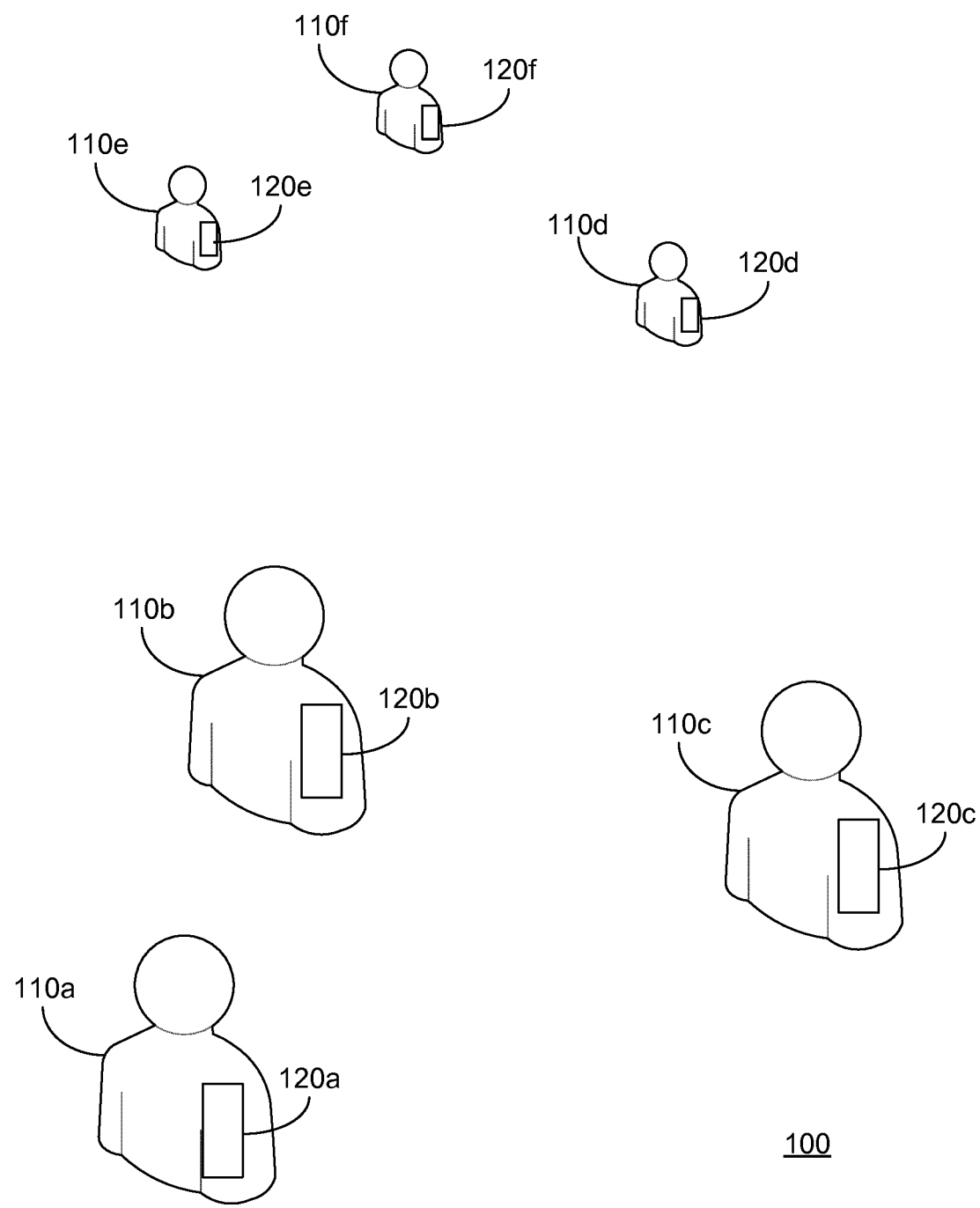
FIG. 1c is illustrating a scenario, according to a third embodiment, with a plurality of individuals, each provided with a communication device, capable of executing coordinated signaling.

At a later occasion, the situation may appear as illustrated in FIG. 1*c*, where communication devices 120*a*,120*b*,120*c* still form one group of coordinated communication devices, whereas, it has been determined that communication devices 120*d*, 120*f*, 120*g*, now being located more distant from the other communication devices 120*a*,120*b*,120*c*, shall form another group, thereby providing for more efficient mutual coordination.

Although the given example illustrate how group formations of communication devices are changed due to location, it is to be understood that also other parameters or combination of parameters, such as e.g. received signal strength or battery capacity of the respective communication devices 120*a*,120*b*,120*c*,110*d*,120*e*,20*f*, may be decisive for coordinated signaling. In case only some communication devices in a group of communication devices are capable of capturing specific data which is considered important to capture and log, these communication devices may be prioritized when determining periodicity for the involved communication devices, such that these communication devices are signaling more frequently than others, this may be especially applicable if all communication devices have similar power levels.

If battery power is to be decisive for how to coordinate signaling communication devices which are considered to have low battery status may be instructed, or may be able to determine, based on their rules, that they are to participate in a coordinated signaling more seldom, whereas communication devices with a high battery status will participate more often. Alternatively, participation in coordinated signaling may be executed by applying a token which is sequentially sent from communication device to communication device, between the communication devices forming a group of communication devices, e.g. by way of applying DTN technique.

The latter scenario may e.g. be described as determining that communication devices 120*a* and 120*e* both have a battery power level which has decreased below threshold value Power_level_3, while remaining communication devices of the group still have a power level above Power_level_6, where the power level can be divided into power level 1 to power level 10, where power level 10 is expressing full power and power level 1 is expressing a minimum power level for allowing the suggested method to be executable. Alternatively, power levels may be compared relative a n average or median power level of communication devices belonging to a specific group. In such a situation the present group is determined to be maintained but in order to save battery power for communication devices 120*a* and 120*e*, these two devices will only participate in coordinated signaling every second occasion, whereas remaining communication devices 120*b*, 120*c*, 120*d*, 120*f* will participate in coordinated signaling on every occasion.

In a further aspect, in the processes of selecting which individual devices that should be selected for periodical blinking, e.g. for the purpose of applying reduced periodicity for at least some communication devices in order to save battery power, it will be beneficial to select the most suitable devices in terms of e.g. properly defining the border between a "confined group" and the "outside" of the group"; i.e. to identify the group's border.

In a typical in-sea scenario it will be efficient to save energy for as many devices as possible, still ensuring that "silent devices not are missed" and in this case not missed can be thought of as "still part of the group" or "being confined in the group". In that identifying a set of communication devices that can define the group's perimeter/border.

More specifically, it will typically be rather non-optimal if a communication device which can be said to be a true border device is selected for reduced/muted blinking as that could leave a gap in the light-pattern visually defining the group's perimeter, with the risk that some interior communication device could drift/move through that gap and end up "outside the group" while still being light-muted/blink-reduced.

In the flip-side of the same aspect of selecting a device for blink-reducing/muting, a device properly located in the middle of the group's point cloud is rather straightforward to select for the mentioned purpose since the risk of such device being lost due to not being visual is minor, given it is located inside the group, i.e. it is having a plurality of other communication devices between itself and the groups borders. It will be beneficial to identify a group's border in terms of identifying what individual communication devices that are the forming the border of the group, i.e. which communication devices that re the outermost ones of a group of communication devices. Given this problem there are known methods to establish this, where one example is mentioned below. Alternatively, modifications according to the so-called traveling-salesman problem, or any similar optimization problem, may be applied.

According to one embodiment, where light is emitted, a group of communication devices identify a point cloud surrounding the group. Coordinated signaling may then be initiated by selecting adjacent points P1 and P2 in the point cloud. Coordinated signaling is started by providing a sweeping movement of light clockwise from participating communication devices, where a vector, having length L is sweeping along a line, passing P1 and P2, until a third point P3 is reached. From point P3 the mentioned process is repeated until reaching another point P4. If signaling has not reached back to point P1 after N repetitions, i.e. the experienced polygon path has not been closed, the length of vector L is increased. When P1 is reached after N repetitions a group area to be applied in the coordinated signaling has been identified. L will typically be selected in relation to device radio coverage, i.e. effective communication range, and will typically also determine how many devices that must participate in coordinated signaling, where a short vector will require more communication devices than a longer vector. The vector may also be selected longer due to environmental parameters, such that high sea may require a longer vector than calm sea.

Alternatively, coordinated signaling may be applied by providing a blink patterns with respect to the relative positions of the communication devices, so that a visual, moving effect is achieved. Such blinking may generate a pattern which more easily detectable, e.g. by periodically repeating signaling of a pattern which appears as concentric circles going from a larger radius to a smaller one.

Figure 2A:
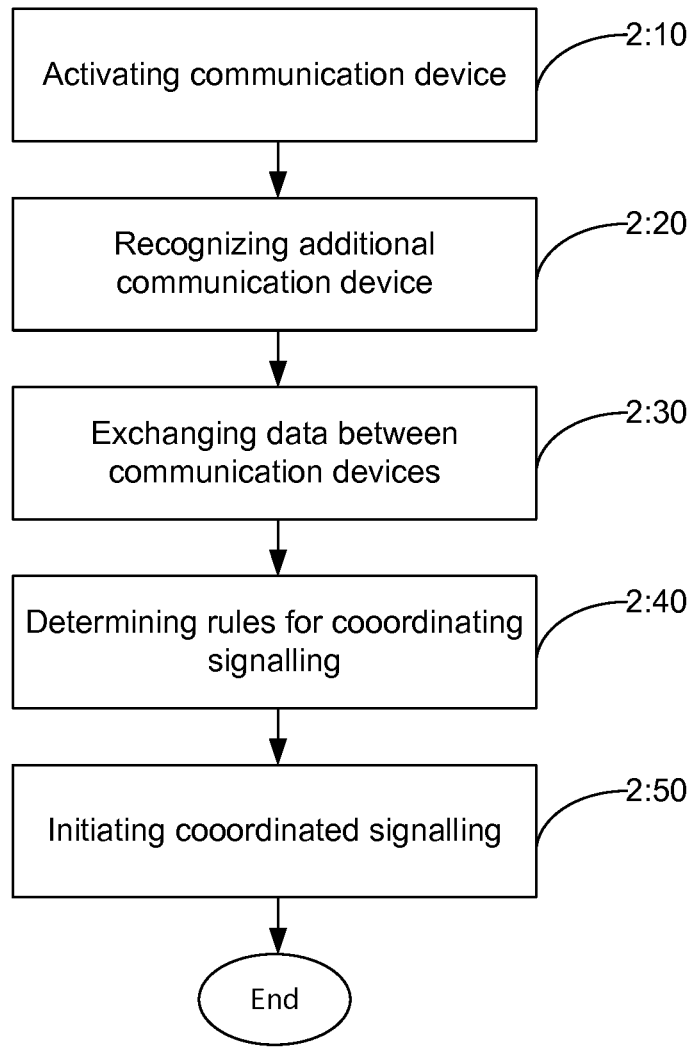
FIG. 2a is a flow chart, illustrating a method according to one embodiment, executable in a communication device which is capable of executing coordinated signaling.

The suggested method will now be described in more detail with reference to FIG. 2a, where the method is executed at a communication device, such as any of the communication devices described with reference to any of FIG. 1a-c. Typically, such a communication device is attached to a life jacket, to the clothes of a user, or to any other type of buoyancy gear. The method is started by activating the communication device when a trigger of the communication device is activated or launched, as indicated with step 2:10. Such a trigger may e.g. be configured to activate when the communication device, or a sensor of the communication device, is exposed to or soaked in water. Thereby, the communication device can be activated automatically, e.g. when an individual, wearing the communication device, is jumping into the water from a boat or ship. Alternatively, activation may be triggered when a sensor senses that it has been buried in snow, by sensing e.g. change in pressure, $CO2$ level or oxygen level. According to yet another embodiment, the communication device may be activated manually, possibly in combination with automatic activation, so that e.g. in case of an unconscious individual, who is not capable of manual activation, activation is triggered automatically e.g. when the individual gets in contact with water.

Once the communication device, from hereinafter referred to as the first communication device, has been activated, the first communication device starts a process for determining whether there are any additional communication devices available in vicinity of the first communication device. The outcome of such a procedure will be decisive of whether the mentioned method for coordinating signaling from two or more communication devices, can be executed or not. Such a step, which can be referred to as a procedure for recognizing at least one, additional communication device, is referred to as step 2:20 in FIG. 2a.

More specifically, such determining can be achieved, if signaling, recognized as signaling transmitted from another communication device, capable of executing the suggested method is received by the first communication device, is received. Such signaling, will from hereinafter be referred to as data exchange signaling, will be interpreted as originating from a corresponding communication device, which potentially can cooperate in coordinated signaling. The data exchange signaling can be recognized by specific data contained e.g. in a packet header. The latter scenario implies that some other communication devices has started a similar method before the first communication device. Alternatively, the first communication device may have initiated transmission of data exchange signaling and received a response to such signaling from one or more other communication device. Consequently, either reception of data exchange signaling or reception of a response to transmitted data exchange signaling is, when executing the suggested method, construed as an indication to execute data exchange between two or more communication devices.

In case more than one communication device is to be involved in the data exchange signaling with the first communication device, the data exchange may be executed by way of broadcasting, or, alternatively, signaling may be executed by exchanging data between two communication devices at a time, until data has been exchanged between all communication devices that are within communication range of each other.

Once the first communication device has recognized at least one additional communication device, it will exchange data with the one or more additional communication devices, as indicated in a step 2:30. Such a data exchange procedure will assure that data, collected by sensors of relevant communication devices are exchanged between communication devices that may potentially be coordinating signaling from the communication devices.

The exchanged data may e.g. comprise environmental data, such as e.g. data indicative of the environment which the individual carrying the communication device is exposed to. More specifically, such data may include one or more of air and/or water temperature, water current, wave height and wind. The exchanged data may also comprise a biological status of the user of the communication device, which may give an indication of how urgent a rescue mission is for that particular user. A lifejacket may e.g. have sensors attached to it such that biological data such as e.g. one or more of pulse, body temperature and breathing activity can be measured and exchanged.

In addition to exchanging data, captured by sensors, also instructions provided from a communication device, acting as a master, can be provided to one or more communication devices, acting as a slave. The instructions may either be unconditional instructions, instructing a receiving communication device on how to perform one or more of future data collection, data exchange and coordinated signaling, or the instructions can be conditional instructions, where the outcome of the instructions depend on the presently applied rules of a communication device receiving the instructions.

While the mentioned instructions are handled automatically by the communication device, exchanged data may also comprise instructions addressing the user, such that a user of a communication device can e.g. receive instructions that the user is drifting away from your group and therefore should strive for moving closer to a certain communication device or a group of communication devices. Exchanged data may comprise information on communication device type, thereby providing information on one or more of the capabilities and performance of a communication device. Exchanged data may also comprise present battery status, which information may be important for determining which frequency or periodicity the communication device is to apply during coordinated signaling of light. Exchanged data may comprise group specific identifiers, which can be used both for identification of a group between communication devices belonging to that group, as well as for identification of adjacent groups of communication devices, which may be potential candidates for future changes of the group constellations. In case a communication device is provided with some type of positioning equipment such as e.g. GPS (Global Positioning System), GNSS (Global Navigation Satellite System) or Glonass (Globalnaya Navigazionnaya Sputnikovaya Sistema), the exchanged data may comprise also positioning information. In order to be able to recognize how relevant exchanged data is, the exchanged data may also comprise a time stamp.

When sufficient data for being able to make a decision on how to proceed has been exchanged between the communication devices, the first communication device is determining rules to be applied for a coordinated signaling, as indicated in another step 2:40. Rules to apply may depend on various criteria, and also based on the data collected from the communication devices. One set of rules may be applied by a communication device acting as a master, whereas another set of rules are applied by a communication device acting as a slave. In an ad-hoc based system, where all communication devices are considered as equal devices in terms of data exchange and coordinated signaling, yet another set of rules may be applied, whereas, in case of a combination of master/slave based communication devices and ad-hoc based communication devices, different sets of rules may be applied for different tasks.

The rules to be applied may determine that exchanged data is not to be overwritten but saved as an historical log, possible a time stamped log. Rules can also specify that some data is to be saved as an historical log, such as e.g. positioning information, and body temperature, whereas only the most recent wave height data is considered.

In case the first communication device is capable of deciding on the rules to be applied, determining is to be construed such that the first communication device is capable of deciding which rules to apply, based on the data acquired by the first communication device, as well as from the other communication devices, with which the first communication device has exchanged data. In such a scenario the first communication device is acting as a master, whereas remaining communication devices, participating in the data exchange are acting as slaves.

However, if the first communication device is not capable of deciding on its own which rules to apply, determining is to be construed as acquiring rules from any of the other communication devices, acting as a master, and determining that these rules are to be applied by the first communication device, thereby acting as a slave.

Once it has been determined which rules to apply and which communication devices that are going to participate in a coordinated signaling, a coordinated signaling, which may include one or more of emission of light, sound and radio signaling, is initiated, as indicated with step 2:50.

Coordinated signaling of light may e.g. be executed as emission of coordinated or synchronized blink, using e.g. Li-Fi (light fidelity) based transmission. Communication devices, belonging to a group of communication devices may e.g. emit a visual blink patterns, such as e.g. SOS, in a coordinated or synchronized manner. Alternatively, a modulated flickering sequence can overlay the general blink pattern, so that additional information, associated with e.g. the group of communication devices, the users of the communication devices, or a combination thereof can be provided in the emitted signaling. Overlaid data may comprise a historical log of one or more parameters and/or most recent updates of other parameters, depending on which type of data that has been considered to be of relevant importance for a rescue team.

An overlaid sequence, as suggested above, may be prepared by a communication device acting as a master, after it has received exchanged data from communication devices of its group. Such a sequence may incorporate a multitude of different information entries, such as e.g. group size, group concentration, e.g. one or more of an indication of whether a group of communication devises is concentrated geographically or spread out over a larger area, environmental data and battery status data. An indication of geographical spreading may be determined by applying e.g. GPS or be estimating the intensity of light sources. Furthermore, overlaid information may be provided as lastly updated data or as a historic log of one or more of the mentioned parameters, where the latter alternative provides a log of historical changes of collected parameters within a group of communication devices, which can be used for prioritization purposes by a rescue mission.

As indicated above data exchange signaling between communication devices will provide for later coordinated signaling between communication devices which are forming a group, based on the exchanged data signaling.

Typically, steps 2:30-2:50 are repeated at a certain time interval, which may be static or dynamic, so that both group constellations and rules for how to coordinate signaling within a respective group of communication devices can be updated based on change of circumstances.

In order to be able to discover additional communication devices, which may appear within communication range of the first communication device, also step 2:20 may be repeated at a certain static or dynamic time interval.

Figure 2B:
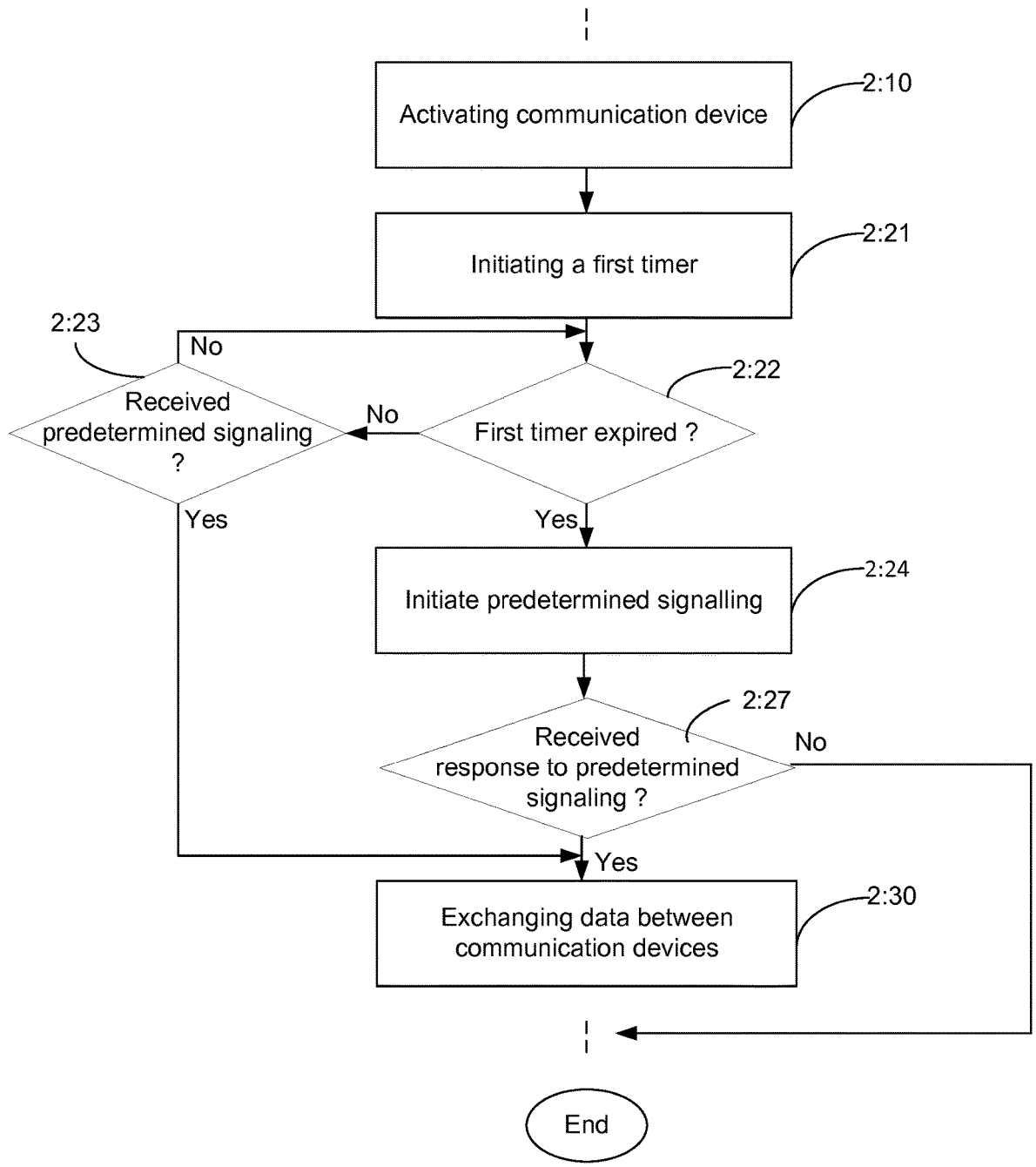
FIG. 2b is a flow chart, illustrating a method according to another embodiment, executable in a communication device which is capable of executing coordinated signaling.

A procedure for how additional communication devices may be recognized, according to step 2:20 of FIG. 2*a*, according to one embodiment, will now be described in further detail, with reference to FIG. 2b. In FIG. 2b, steps 2:21-2:27 are representing sub steps of step 2:20, as illustrated in FIG. 2a.

After having activated the first communication device according to step 2:10, a timer, here referred to as a first timer, is set to a time interval, as indicated with step 2:21 for allowing at least one other communication device to be identified by the first communication device, as indicated with step 2:23, where received signaling, from hereinafter referred to as predetermined signaling, such as e.g. an identity or code, is interpreted as signaling received from a compatible communication device, capable of performing coordinated signaling with the first communication device. The predetermined signaling may be provided in a preamble or header of a transmitted message, where the message may comprise instructions on data to be exchanged. Alternatively, instructions on which data to exchange may be sent after predetermined signaling has been exchanged and interpreted by the respective communication devices.

If predetermined signaling has been received, i.e. another communication device has been identified, as indicated with the "Yes" branch of step 2:23, data exchange between the communication devices is initiated, as indicated with step 2:30. Even if predetermined signaling is received at step 2:23, step 2:23 will, according to one embodiment be delayed until the first timer expires, before the method continues at step 2:30. Thereby, all communication devices, rather than only the first responding communication device, which is within communication range of the first communication device will be able to identify themselves, by providing predetermined signaling to the first communication device, before the data exchange proceed of step 2:30, as described above with reference to FIG. 2a, is executed. If, however, the first timer expires before any predetermined signaling is received by the first communication device, as indicated with the "Yes" branch of FIG. 2:22, the first communication device initiates predetermined signaling, as indicated with step 2:24, and if a response to predetermined signaling is received, as indicated with the "Yes" branch of FIG. 2:27, data exchange can be executed between the communication devices, as indicated with step 2:30. The method can then continue according to FIG. 2a.

Figure 2C:
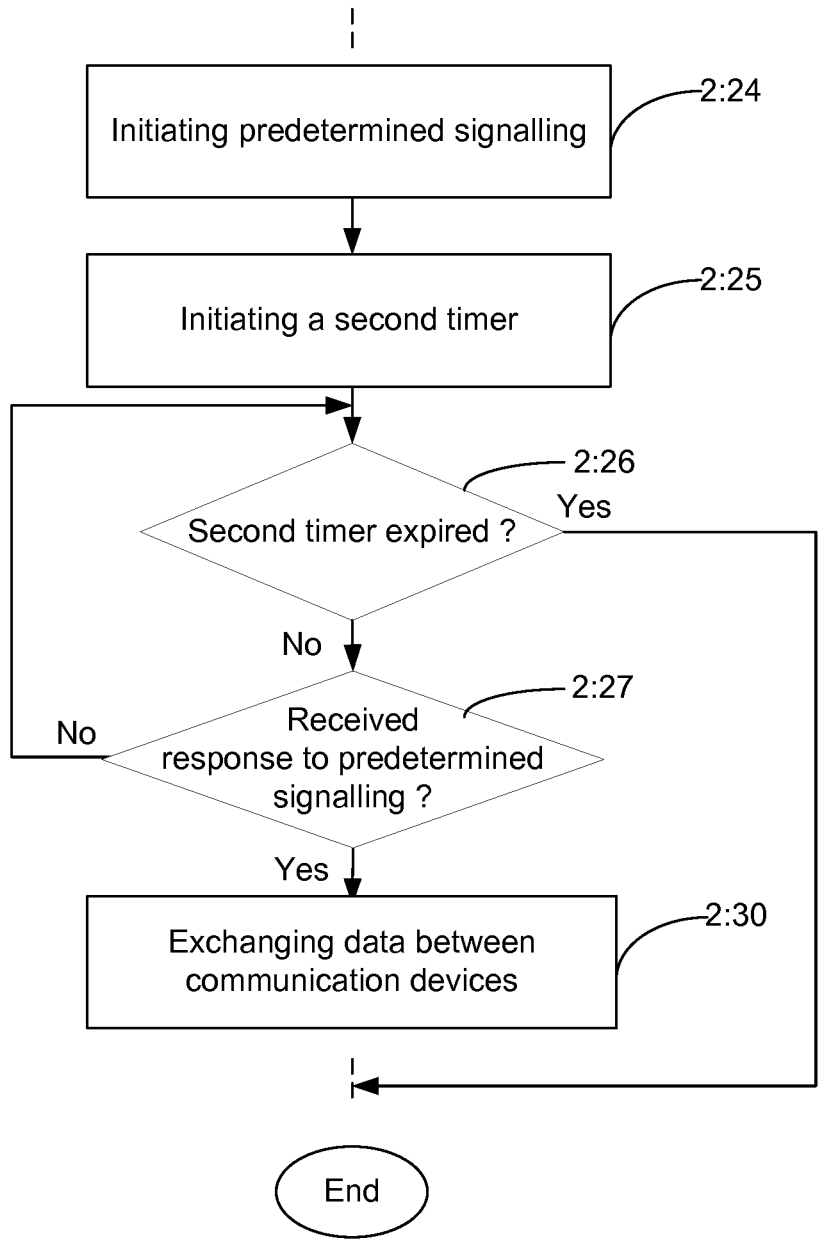
FIG. 2c is a flow chart, illustrating a method according to yet another embodiment, executable in a communication device which is capable of executing coordinated signaling.

As indicated in FIG. 2c, step 2:24 of FIG. 2b may be followed by initiation of a second timer, as indicated with step 2:25 of FIG. 2c, thereby allowing for the first communication device to execute an identification procedure for the duration of the time interval set for the second timer. If no response to the predetermined signaling is identified by the first communication device before expiry of the second timer, the described method is terminated, as indicated with the "Yes" branch of step 2:26, whereas if a response to predetermined signaling is received from another communication device, as indicate with the "Yes" branch of step 2:27, the process of FIG. 2a can proceed from step 2:30. Also step 2:27 may be delayed for the duration of the time interval of the second timer, thereby allowing more communication devices to identify themselves with the first communication device, before data exchange can be executed between all mutually identified communication devices.

The method suggested above can be executed on a communication device, which has been adapted therefore. The communication device may be provided as an integrated part or attachable part of e.g. clothing, a life jacket or a survival suite. The communication device, is hosted in a housing which is made robust enough for the environment that it will be exposed to. Typically, such a housing will be water tight for being able to get soaked in water.

More specifically, a communication device is suggested which is adapted to activate itself, or more specifically a process for enabling coordinated signaling as disclosed herein, in response to recognizing a cause for triggering such activation. Such triggering may be initiated manually by a user of the communication device, actuating an actuator, such as e.g. a button or touch display, or triggering may be executed automatically, based on input from one or more sensors, such as e.g. a sensor recognizing that it has been soaked in water. recognizing at least one second communication device.

The communication device is also adapted to exchanging data between the itself and one or more other communication devices, in response to recognizing one or more other communication devices. In a search process, the communication device is adapted to make other communication devices, located within communication range to become aware of it and vice versa.

Once recognized and mutually identified, the communication device is adapted to participate in data exchange between the communication devices. With sufficient data exchanged for proceeding with the suggested process, the communication device is adapted to determine rules to be applied for a coordinated signaling, involving the communication device and at least one of the other communication devices. Such determining of rules will be based on at least part of the exchanged data and may be executed by applying rules already stored at, or accessible to, the communication device, by applying rules provided from one of the other communication devices, or by a combination of both.

The communication device is also adapted to initiate the actual coordinated signaling based on the determined rules, where coordinated signaling is to be executed between by communication devices which are considered to operate as a group. Once communication devices have been identified to each other, the communication device is adapted to repeat the process as described above, so that updated, exchanged data can result in updated rules, updated data exchange procedures, as well as updated procedures for how to coordinate signaling and how to form groups of communication devices.

The communication device is adapted to recognize one or more communication devices by receiving predetermined signaling from each, respective other communication device, where the predetermined signaling may be any type of signaling which the communication device is adapted to recognize as originating from a communication device which is capable of participating in the suggested coordinated signaling. Alternatively, or in addition, the communication device may be adapted to recognize another communication device by first initiating transmission of predetermined signaling itself, and then receiving a response to the initiated transmission of the predetermined signaling.

In order to allow for sufficient time for mutual identification of communication devices which are located within communication range of each other, and, thus, of communication devices which potentially can participate in cooperated signaling, the communication device may be adapted to apply and initiate a timer upon having initiated transmission of predetermined signaling and to execute the data exchange, in case a response to the initiated transmission of predetermined signaling has been received from the at least one other communication device, prior to expiry of a time interval of the initiated timer.

Furthermore, the communication device may be adapted to apply another timer in response to the activation of the first communication device, and to initiate the predetermined signaling, in case no predetermined signaling has been received from an at least one other communication device before expiry of a timer interval of the initiated other timer, or to recognize the at least one other communication device, in case predetermined signaling has been received from an at least one other communication device before expiry of the timer interval of the initiated other timer.

Typically, the communication device applying one or both of the timers mentioned above will continue to exchange data or signaling until expiry of the timer, in order to allow more than one other communication device to exchange data or signaling.

The communication device may comprise various types of sensors or be adapted to acquire data from various types of sensors which it have access to, where such sensors may be capable of capturing data associated with one or more of: environmental data, biological status of a user of a communication device, instructions to a communication device, instruction to a user of a communication device, communication device type, battery status, positioning data, group specific identifier, and time stamp.

Once data has been exchanged between communication devices, the described communication device is adapted to determine a group of communication devices for which coordinated signaling is to be applied is based on at least one of: relative geographical positions of the communication devices, received signal strength, and battery status. The communication device is typically adapted to repeatedly update such a determination, so that group constellations may change whenever this is required, due to changes in acquired and exchanged data.

The communication device may be adapted to operate as a slave or correspondingly, wherein it is adapted to receive an indication from another communication device that it is to belong to a specific group of communication devices. Alternatively the communication device is adapted to operate as a master or correspondingly, whereby it is adapted to determine that the at least one other communication device shall belong to a specific group of communication devices, and to transmit, to the at least one other communication devices, an indication that the at least one other communication device shall belong to a specific group of communication devices. The communication device may also be adapted to operate either as a master or a slave, where such a role may change due to circumstances, i.e. the most suitable communication device of a specific group at a time is appointed the role of a master.

The communication device may also be adapted to change group constellation or to instruct one or more other communication devices to change group, if an alternative group constellation is found to be more efficient, based on acquired data.

In order to enable communication devices to identify and distinguish group members from each other, the communication device may be configured to transmit the predetermined signaling, the signaled, exchanged data or both by applying a group specific header.

The communication device may be adapted to coordinate signaling of light, emitted from communication devices belonging to a specific group of communication devices. The communication device may be adapted to execute such a coordination by coordinating any of synchronized blink of light from a specific group of communication devices, synchronized exchange of data between communication devices belonging to a specific group of communication devices, and synchronized power usage by communication devices belonging to a specific group of communication devices.

The communication device may be adapted to coordinate synchronization of blink of light from a specific group of communication devices, by applying at least one communication device specific blink frequency. Thereby the communication device may be adapted to consider one or more parameters for instructing different other communication devices to apply different blink frequencies, in order to obtain more efficient coordinated signaling, with respect to e.g. power consumption or relative geographical positions of communication devices.

Figure 3:
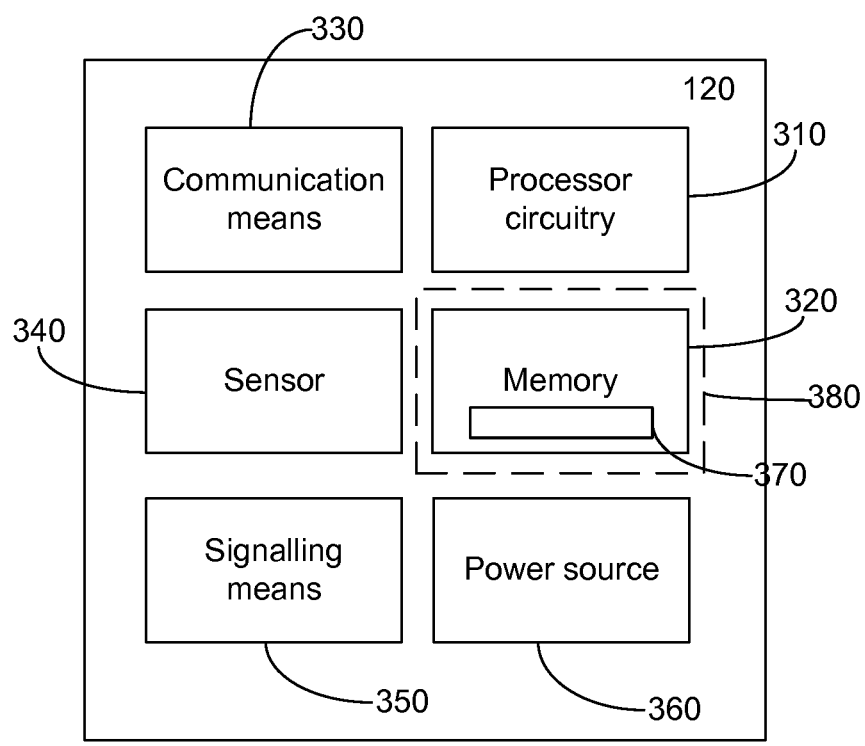
FIG. 3 is a block scheme, illustrating a communication device according to one embodiment.

A communication device 120 according to one embodiment will now be described with reference to FIG. 3, which comprise a processor circuitry 310 and a memory 320, where the memory comprises a computer program 370 or computer readable instructions, which, when executed by the processor circuitry 310, causes the communication device 120 to execute a method as disclosed above. The communication device 120 also comprise communication means 330, such as e.g. a short range transceiver, enabling communication devices to communicate with each other, sensors 340, capable of capturing data, signaling means 350, capable of performing coordinated signaling as described herein, where the signaling means 350 may e.g. be a light emitting device, capable of emitting light at a determined frequency. The communication device 120 also comprise a power source 360, such as e.g. a battery, a solar cell or a combination of both, or any other type of power source suitable to provide power to the mentioned functional entities of the communication device 120. Although only one sensor is presented in FIG. 3, it is to be understood that a typical communication device 120 will comprise a plurality of sensors, which may be capable of both activating the communication device 120 whenever required, as well as to capture data which will be suitable for determining rules to apply, for determining group constellations, for determining how to coordinate signaling and for consolidating data which can be signaled and provided to an approaching rescuer for a more efficient rescue mission. The described communication device 120 may be adapted as exemplified above. The communication device 120 may also comprise a computer program product 380, which may be configured as a memory for holding computer readable instructions. Th computer program product may e.g. be any of an optical disc, such as a CD (compact disc) or a DVD (digital versatile disc) or a Blu-Ray disc.

Figure 4:
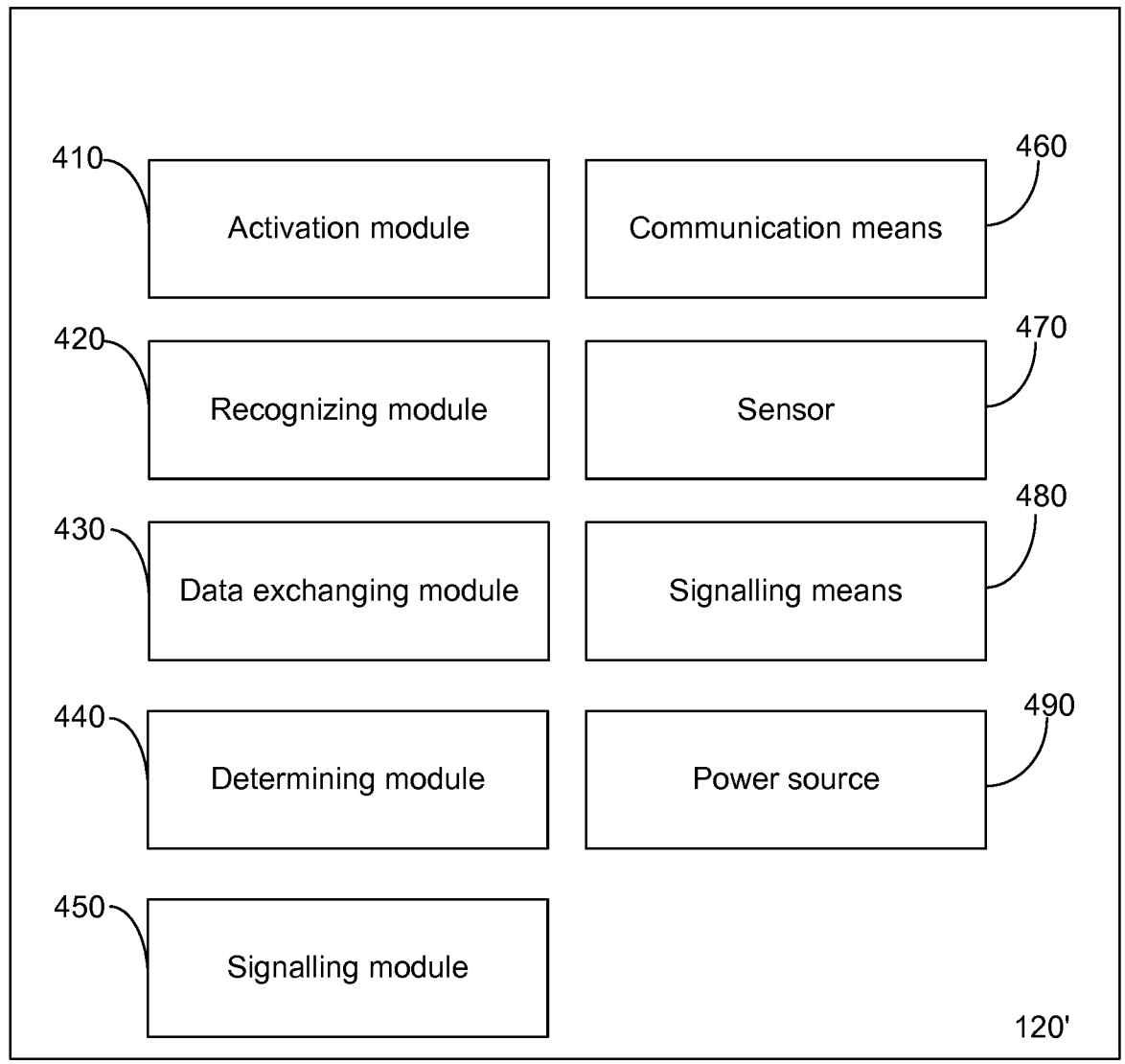
FIG. 4 is a block scheme, illustrating a communication device according to another embodiment.

A communication device 120' according to another embodiment will now be described with reference to FIG. 4, where a communication device configured to operate according to any of the embodiments mentioned above, is configured as comprising a plurality of interacting modules or functions.

The communication device 120' comprise: an activation module 410 for activating a first communication device in response to recognizing a cause for triggering such activation, corresponding to step 2:10 of FIG. 2; a recognizing module 420 for recognizing at least one second communication device, corresponding to step 2:20 of FIG. 2; a data exchanging module 430 for exchanging data between the first and the at least one second communication device, in response to recognizing the at least one second communication device, corresponding to step 2:30 of FIG. 2; a determining module 440 for determining, based on the exchanged data, rules to be applied for a coordinated signaling, from the first communication device and at least one of the at least one second communication device, corresponding to step 2:40 of FIG. 2, and a signaling module 450 for initiating the coordinated signaling, based on the determined rules, corresponding to step 2:50 of FIG. 2. The communication device 120' also comprise communication means 460 enabling communication between compatible communication devices, one or more sensors, here represented by sensor 470, signaling means 480, which may be e.g. a low energy light source, capable of executing coordinated signaling, and a power source or a combination of power sources, here represented by power source 490.

One way of illustrating how two communication devices, here represented by a first communication device 120,120' and a second communication device 120", both capable of executing coordinated signaling, are interacting with each other when preparing for coordinated signaling will now be described in further detail with reference to FIG. 5. As indicated in the figure, both communication devices are initially activated, independent of each other, as indicated with step 5:1*a* and 5:1*b*, respectively. As indicated with another step 5:2*a*, the first communication device 120,120' is recognized by the second communication device 120", whereas in another step the second communication device 120" is recognized by the first communication device 120, 120'. It is obvious from what has been mentioned above, that steps 5:2*a* and 5:2*b* may be executed in the opposite order, depending on which communication device that first recognize the other one. Once both communication devices 120, 120',120" are aware of each other, they both can initiate and execute data exchange between each other, as indicated with another step 5:3. Once relevant data has been exchanged between the two communication devices 120, 120',120", both communication devices 120,120'120" will, independent of each other, determine rules to be applied for the coordinated signaling, as indicated with steps 5:4*a* and 5:4*b*, respectively. Once the respective rules to be applied by the respective communication device 120,120'120" have been determined, each communication device 120, 120', 120" will be able to execute coordinated signaling.

Figure 5:
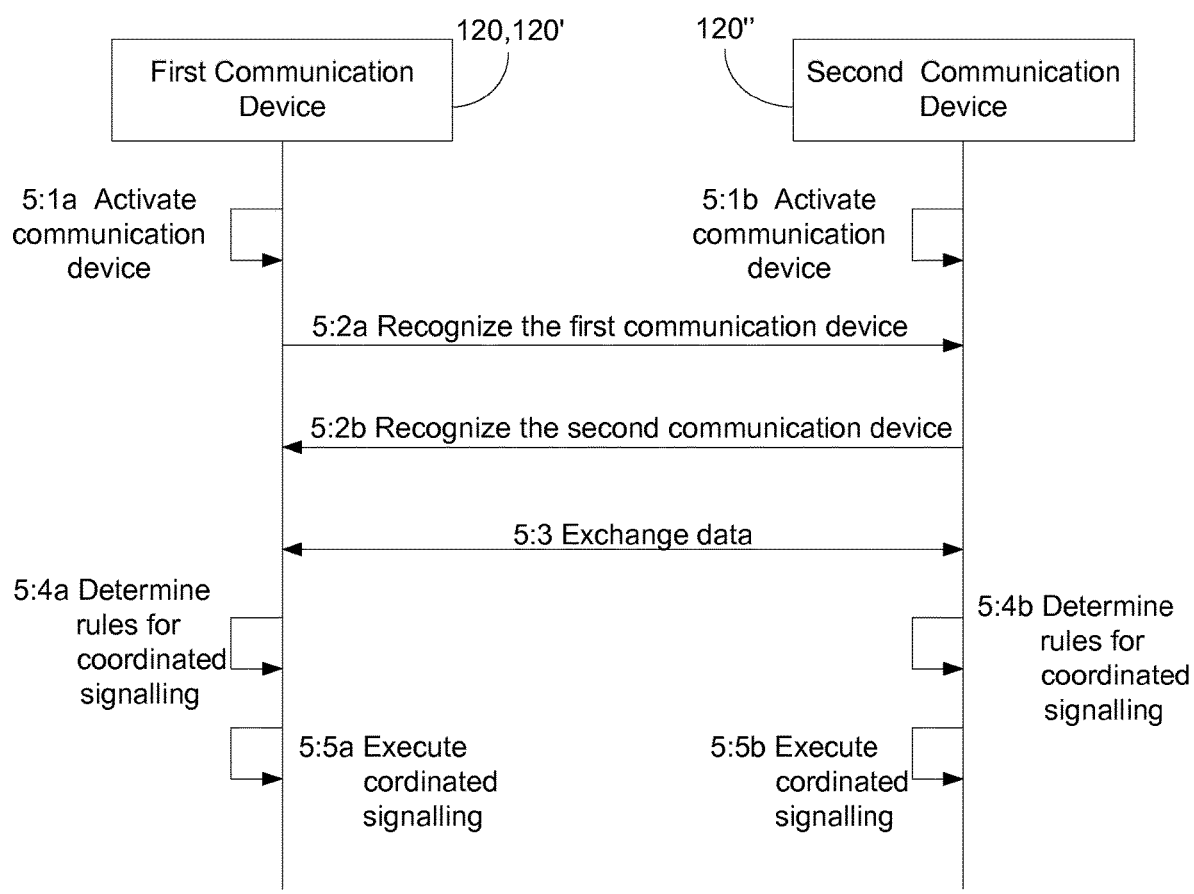
FIG. 5 is a signaling scheme, illustrating how two communication devices may interact in order to initiate coordinated signaling, according to one embodiment.

It is to be understood that, although FIG. 5 is only describing interactions between two communication devices, the described interactions may, and typically will be executed between more communication devices. In such a scenario, the mutual exchanges need to be executed between more communication devices, so that all communication devices that are to coordinate signaling between each other mutually exchange relevant data with each other, so that the most optimal coordination can be obtained.

The invention claimed is:

1. A method, executed at a first communication device, for enabling communication between a group of communication devices, including the first communication device, the method comprising:
   responsive to data captured by at least one sensor of the first communication device satisfying a trigger condition, initiating an attempt to recognize at least one second communication device;
   responsive to successful recognition of the at least one second communication device, exchanging data between the first and the at least one second communication device;
   determining, based on the exchanged data, rules to be applied for a coordinated signaling, from the first communication device and at least one of the at least one second communication device; and
   initiating the coordinated signaling, based on the determined rules.

2. The method according to claim 1, wherein the recognizing of the at least one second communication device is done in response to receiving predetermined signaling from the at least one second communication device.

3. The method according to claim 1, wherein the recognizing of the at least one second communication device is done in response to:
   initiating transmission of predetermined signaling, and
   receiving a response to the initiated transmission of predetermined signaling, from the at least one second communication device.

4. The method according to claim 3, comprising the further steps of:
   initiating a second timer, in response to having initiated transmission of predetermined signaling, and
   executing the data exchange, in case a response to the initiated transmission of predetermined signaling has been received from the at least one second communication device, prior to expiry of a time interval of the initiated second timer.

5. The method according to claim 1, comprising the further steps of:
   initiating a first timer, in response to the successful recognition of the first communication device, and
   initiating transmission of predetermined signaling, in case no predetermined signaling has been received from an at least one second communication device before expiry of a timer interval of the initiated first timer, or
   recognizing the at least one second communication device, in case predetermined signaling has been received from an at least one second communication device before expiry of the timer interval of the initiated first timer.

6. The method according to claim 1, wherein exchanged data comprise at least one of:
   environmental data;
   biological status of a user of a communication device;
   instructions to a communication device;
   instruction to a user of a communication device;
   communication device type;
   battery status;
   positioning data;
   group specific identifier, and
   time stamp.

7. The method according to claim 1, wherein a group of communication devices for which coordinated signaling is to be provided is determined based on at least one of:
   relative geographical positions of the communication devices;
   received signal strength, and
   battery status.

8. The method according to claim 1, comprising the further step of:
   receiving, from one of the at least one second communication device, an indication that the first communication device belongs to a specific group of communication devices.

9. The method according to claim 8, wherein the indication comprises an instruction indicating a change of group composition.

10. The method according to claim 1, comprising the further steps of:
    determining that the at least one second communication device shall belong to a specific group of communication devices, and transmitting, to the at least one second communication devices, an indication that the at least one second communication device shall belong to a specific group of communication devices.

11. The method according to claim 1, wherein at least one of the predetermined signaling and the signaling of the exchanged data comprise a group specific header.

12. The method according to claim 1, wherein the coordinated signalling comprises coordinated signalling of light.

13. The method according to claim 1, wherein the coordinated signalling includes coordination of at least one of:
synchronized blink of light from a specific group of communication devices;
synchronized exchange of data between communication devices belonging to a specific group of communication devices, and
synchronized power usage by communication devices belonging to a specific group of communication devices.

14. The method according to claim 13, wherein the coordinated signalling includes synchronization of blink of light from a specific group of communication devices, by applying at least one communication device specific blink frequency.

15. The method according to claim 1, wherein the cause for triggering is detection of the first communication device being exposed to water.

16. The method according to claim 1, wherein the initiating of the attempt to recognize at least one second communication device is performed responsive to the data captured by the at least one sensor satisfying the trigger condition and without reliance on whether any communication is received from external the first communication device.

17. A first communication device, for enabling communication between a group of communication devices, including the first communication device, the first communication device being adapted to:
responsive to data captured by at least one sensor of the first communication device satisfying a trigger condition, initiate an attempt to recognize at least one second communication device;
responsive to successful recognition of the at least one second communication device, exchange data between the first and the at least one second communication device;
determine, based on the exchanged data, rules to be applied for a coordinated signalling, from the first communication device and at least one of the at least one second communication device; and
initiate the coordinated signalling, based on the determined rules.

18. The first communication device according to claim 17, wherein the communication device is adapted to recognize the at least one second communication device in response to receiving predetermined signaling from the at least one second communication device.

19. The first communication device according to claim 17, wherein the first communication device is adapted to recognize the at least one second communication device in response to:
initiating transmission of predetermined signaling, and
receiving a response to the initiated transmission of predetermined signaling, from the at least one second communication device.

20. The first communication device according to claim 19, Wherein the first communication device is further adapted to:
initiate a second timer, in response to having initiated transmission of predetermined signaling, and
execute the data exchange, in case a response to the initiated transmission of predetermined signaling has been received from the at least one second communication device, prior to expiry of a time interval of the initiated second timer.

21. The first communication device according to claim 17, wherein the first communication device is further adapted to:
initiate a first timer, in response to the successful recognition of the first communication device, and
initiate transmission of predetermined signaling, in case no predetermined signaling has been received from an at least one second communication device before expiry (of a timer interval of the initiated first timer, or
recognize the at least one second communication device, in case predetermined signaling has been received from an at least one second communication device before expiry of the timer interval of the initiated first timer.

22. The first communication device according to claim 17, wherein the first communication device is further adapted to initiate the attempt to recognize at least one second communication device in response to the data captured by the at least one sensor satisfying the trigger condition and without reliance on whether any communication is received from external the first communication device.

* * * * *